July 15, 1952    D. J. SIKORRA      2,603,770
ELECTRIC REGULATOR UTILIZING SHORT TIME
CONSTANT DERIVATIVE TRANSFORMERS
Filed March 3, 1951

Inventor
Daniel J. Sikorra
by Walter L. Mullen, Jr.
Attorney

Patented July 15, 1952

2,603,770

UNITED STATES PATENT OFFICE 2,603,770

ELECTRIC REGULATOR UTILIZING SHORT TIME CONSTANT DERIVATIVE TRANSFORMERS

Daniel J. Sikorra, Milwaukee, Wis., assignor to Allis-Chalmers Manufacturing Company, Milwaukee, Wis.

Application March 3, 1951, Serial No. 213,697

4 Claims. (Cl. 322—19)

This invention relates in general to electric regulating systems and in particular to means for eliminating the effects of time delays in the response of such regulating systems.

In regulating systems employing a plurality of cascaded rotating amplifiers, a considerable time elapses between a change in the input signal to the first machine in the series and the resulting desired change in the output of the last machine in the series, owing to the inductive nature of the field windings of the machines. This time delay is a disadvantage where it is desired to have the output of the cascaded machines respond quickly to changes in the input to the first machine, as in voltage regulating systems and the like.

In some of such regulators, a considerable amount of resistance is inserted in series with each of the field windings to reduce the time constants of the field winding circuits and thereby reduce the time delay introduced into the regulator by the field windings. However, owing to the large amount of resistance required to reduce the time constant of a field winding circuit having a considerable amount of inductance, such systems greatly reduce the steady state gain of the system and require additional machines to secure the desired signal amplification.

The above disadvantages may be overcome by providing anticipating means which requires only a small amount of power for its operation and which assists the input signal during changes thereof to effectively eliminate the effect of inductive time delays in a regulating system.

It is therefore an object of this invention to provide an improved electric regulating system having means for reducing the response time of the regulating system.

It is an additional object of this invention to provide an improved electric regulating system having anticipating means which requires a small amount of power for its operation.

It is a further object of the present invention to provide anticipating means for an electric regulating system which increases the transient gain of the system without excessive reduction of steady state gain of the system.

Figure 1:
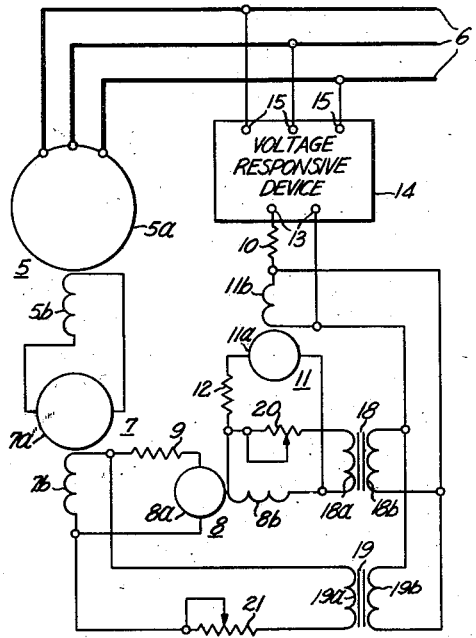
Figure 2:
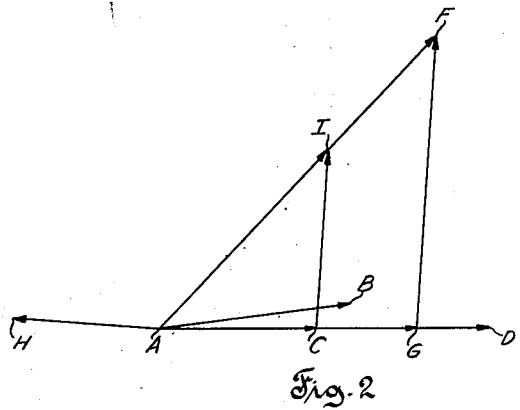
Figure 3:
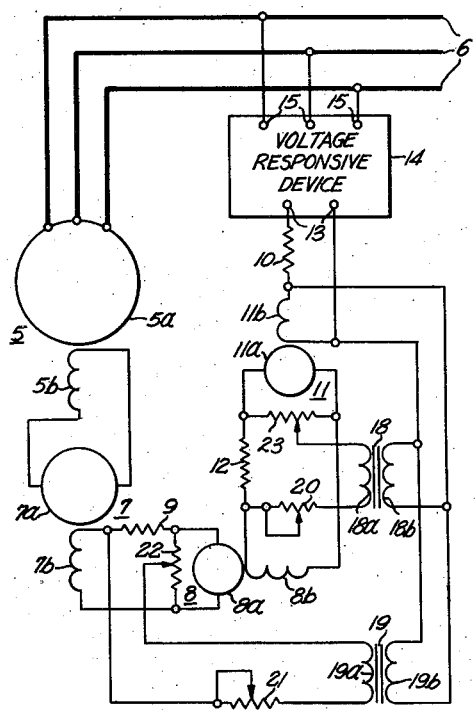
Figure 4:
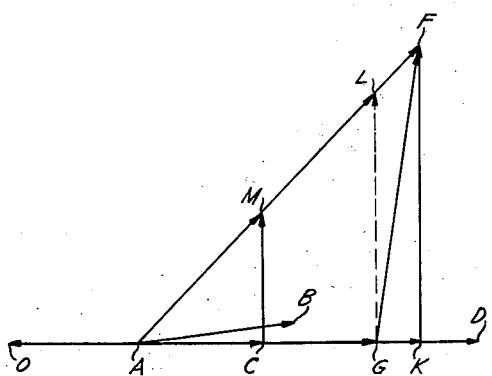

Objects and advantages other than those set forth above will be apparent from the following description when read in connection with the accompanying drawing, in which:

Fig. 1 diagrammatically illustrates the circuits and apparatus of one embodiment of the invention;

Fig. 2 is a vector diagram illustrating the operation of the embodiment of Fig. 1;

Fig. 3 diagrammatically illustrates an alternate embodiment of the invention, and Fig. 4 is a vector diagram illustrating the operation of the embodiment of Fig. 3.

Referring to Fig. 1, one embodiment of the invention is illustrated in connection with the control of a dynamoelectric machine 5 having an armature 5a supplying a load circuit represented by conductors 6. Machine 5 is provided with a field winding 5b supplied with variable excitation from the armature 7a of an exciter generator 7. The field winding 7b of exciter 7 is supplied with excitation current from the armature 8a of an amplifying exciter 8 in series with resistor 9. Field winding 8b of exciter 8 receives excitation current from the armature 11a of an additional amplifying exciter 11. The resistance of armature 8a is preferably greater than the resistance of field winding 7b. If the armature 8a has insufficient resistance, the deficiency may be supplied by connecting the armature in series with resistor 9. Resistor 9, if utilized, together with the internal resistance of armature 8a constitute resistance means connected in series with armature 8a and field winding 7b. Similarly, a resistor 12 may be connected in series with armature 11a so that their joint resistance is greater than the resistance of winding 8b. Field winding 11b of exciter 11 is connected to the output terminals 13 of any suitable known condition responsive device or network shown in the drawing as a block 14, having input terminals 15 connected to conductors 6.

If the regulating system is regulating the voltage of conductors 6, device 14 has impressed thereon through terminals 15 three voltages which are measures of the voltages of the conductors 6, and device 14 operates to produce at its output terminals 13 a unidirectional voltage of either polarity responsive to deviations in the average value of the voltages impressed on terminals 15 from a predtermined value. This unidirectional voltage is impressed on field winding 11b and a resistor 10 and successively amplified by exciters 11, 8, 7 to impress on field winding 5b a voltage tending to return the voltage of conductors 6 to the desired value. Although two amplifying exciters have been illustrated in Fig. 1, it will be apparent that the number of such exciters used will depend upon the amount of power amplification of the input signal desired.

In the absence of suitable anticipating compensation, a considerable time elapses between a change in the voltage of output terminals 13 and the desired change in the current of field winding 5b, owing to the inductive nature of field windings 11b, 8b, 7b, 5b. To decrease this elapsed time, this invention provides at least one impulse network which provides an anticipating signal tending to eliminate the delay in the regulator, thereby decreasing the time of response of the regulator and increasing the system stability. As shown in Fig. 1, the regulator is provided with derivative transformers 18, 19 having primary windings 18a, 19a, respectively, and secondary windings 18b, 19b, respectively. Winding 18a is connected across field winding 8b of exciter 8 and winding 19a is connected across field winding 7b of exciter 7. Secondary windings 18b, 19b are connected across or in series with field winding 11b.

Each of the circuits of the primary windings 18a, 19a has a negligible time constant; that is, the ratio of the inductance of the winding to the respective primary circuit resistance is so low that the current therein and the voltage impressed across the primary circuit are substantially in phase with each other. If a sinusoidal voltage component is impressed from armature 11a through resistor 12 on the primary circuit of transformer 18 for example, the voltage across secondary winding 18b therefore leads the current through the prmary circuit of transformer 18 by substantially ninety degrees and is proportional in magnitude to the angular velocity of impressed voltage component. If the resistances of primary windings 18a, 19a are insufficient to insure the desired value of time constant, adjustable resistors 20, 21 may be connected in their primary circuits.

Fig. 2 is a vector diagram illustrating the operation of the anticipating network of the invention in the part of the system comprising winding 11b, armature 11a, resistor 12, field winding 8b and transformer 18. Vector AB of Fig. 2 represents the signal voltage component appearing across output terminals 13 of device 14 in response to a variation in the voltage of conductors 6 from the predetermined desired value. It is assumed that this signal voltage component is of sinusoidal wave shape so that a vector representation of the operation of the regulator may be utilized, although the operation of the invention is not dependent upon any particular wave shape appearing across terminals 13. Vector AC represents the current component flowing through resistor 10 and field winding 11b as a result of voltage AB, and this current lags the voltage AB by a predetermined angle determined by the time constant of the circuit of field winding 11b and the frequency of the impressed signal. It will be understood that this predetermined angle be made negligible by increasing the size of resistor 10 to a value sufficient to reduce the time constant of the circuit to a negligible value for the highest frequency of the impressed signal.

If the response of the regulator is to be as fast as possible, the amplified corrective voltage component of armature 8a must be substantially in time phase with the signal current and voltage input from device 14. Vector AD represents this desired voltage of armature 8a, in time phase with the signal current AC over a considerable range of angular velocities of the signal input. Assuming that the time constant of the circuit comprising armature 11a, resistor 12 and field winding 8b is one and that the angular velocity of the signal voltage impressed on winding 11b is one radian per second, the voltage induced in armature 11a leads the current through field winding 8b and the voltage induced in armature 8a by forty-five degrees and may be represented by vector AF. Vector AF is composed of the ohmic voltage drop AG in armature 11a and resistor 12 and the voltage GF across field winding 8b. The voltage GF leads the voltage AG by substantially ninety degrees owing to the relatively small internal resistance of field winding 8b.

The vectors described thus far show that to cause the voltage AD across armature 8a to be substantially in time phase with the signal input current AC, the current through field winding 11b must have a vector position along vector AF. Therefore, a second current component must be added to the signal current component AC to produce the desired field current in winding 11b. This current component is supplied by derivative transformer 18 which has its primary winding 18a connected across field winding 8b. As mentioned above, the voltage across secondary winding 18b leads the voltage GF across and the current through the primary circuit of transformer 18 by substantially ninety degrees, causing the voltage across secondary winding 18b to have a position and magnitude represented by vector AH, leading vector GF by substantially ninety degrees.

Owing to the inductance of field winding 11b, the second current component in secondary winding 18b will lag the voltage AH of secondary winding 18b by substantially ninety degrees and will therefore be substantially in phase with the voltage GF across field winding 8b, and may be represented by vector CI. The current CI is added vectorially to the signal current AC to produce the current AI equal to the desired total current through field winding 11b. It will be seen that the resultant current AI in field winding 11b is in phase with voltage AF, thereby producing the required field current in winding 11b to cause the voltage AD of armature 8a to be substantially in phase with the signal input current AC.

The operation of the part of the system comprising armature 8a, resistor 9 and field winding 7b may be represented by a vector diagram similar to Fig. 2. Such a diagram would show that the derivative signal current from secondary winding 19b of derivative transformer 19 compensates for the time delay introduced by field winding 7b, in a manner identical to the operation of transformer 18 with respect to field winding 8b, so that the net delay through the two circuits is substantially zero. Thus, the current through field winding 7b and the voltage across armature 7a are substantially in phase with the signal input current from device 14. Resistors 20, 21 may be adjusted to vary the amplitude of the currents flowing in primary windings 18a, 19a, respectively, to provide the desired anticipating compensation.

Although the vector diagram of Fig. 2 illustrates the circuit conditions for one particular angular velocity of the impressed signal, it will be apparent that the system is operative to provide anticipating compensation for a wide range of angular velocities of the impressed signal. For example, if the angular velocity of the input signal is doubled with respect to its value for the vector diagram of Fig. 2, the required inductive voltage across field winding 8b is doubled to maintain the same current through this field winding 8b and the voltage AD across armature 8a. This doubling of the voltage across field winding 8b in combination with the doubled angular velocity quadruples the voltage across secondary winding 18b.

This quadrupled voltage across winding 18b is impressed across winding 11b whose reactance has doubled with respect to its value for the vector diagram of Fig. 2, therefore causing winding 18b to supply to winding 11a a derivative current doubled in magnitude with respect to its value in Fig. 2. This doubled secondary current is again added vectorially to the signal current AC to produce the required field current in winding 11b to produce across armature 11a the increased voltage required to maintain voltage AD in phase with the signal current AC. Thus, it can be demonstrated that this invention is operative to provide proper anticipating compensation for input signals having a considerable range of angular velocity. This invention therefore improves the transient response of the regulating system by eliminating the effects of the inductive time delays therein.

Fig. 3 illustrates an embodiment of the invention which provides more accurate anticipating compensation than the embodiment of Fig. 1, especially when the internal resistances of the field windings are relatively high. The connections and apparatus of Fig. 3 are similar to those of Fig. 1, except that voltage dividers 22, 23 are connected across armatures 8a, 11a, respectively. Primary winding 19a of derivative transformer 19 has one terminal connected between field winding 7b and resistor 9 and has the other terminal connected to the adjustable tap of voltage divider 22. Primary winding 18a similarly has one terminal connected between resistor 12 and field winding 8b and has its other terminal connected to the adjustable tap of voltage divider 23. The purpose of voltage divider 23 is to impress across primary winding 18a of derivative transformer 18 a voltage which is substantially in phase with the pure inductive voltage component across field winding 8b, which leads the current through the field winding 8b by ninety degrees.

As mentioned above, owing to the internal resistance of field winding 8b, the voltage GF across field winding 8b does not lead the voltage AG across resistor 12 by exactly ninety degrees. As shown in Fig. 4, the voltage GF across winding 8b is composed of the vector GK representing the voltage component due to the internal resistance of winding 8b and the vector KF representing the pure inductive voltage component across winding 8b. Vector AF represents the voltage across armature 11a and across the outer terminals of voltage divider 23. Point L on vector AF represents the adjustable tap of divider 23, and it will be seen that by suitable adjustment of the position of this adjustable tap, the voltage GL impressed across primary winding 18a will be proportional to and substantially in time phase with the pure inductive voltage component KF across field winding 8b. The voltage AO across secondary winding 18b leads the voltage GL by substantially ninety degrees, while the current CM supplied from secondary winding 18b to field winding 11b is substantially in phase with voltage GL and leads current AC by substantially ninety degrees. Current CM is added vectorially with current AC to produce the required field current AM in field winding 11b. The operation of voltage divider 22 to impress on primary winding 19a a voltage proportional to and substantially in phase with the pure inductive voltage component across field winding 7b, so that the time delay of field winding 7b is effectively eliminated, is similar to that described above for divider 23.

The accuracy of the anticipating compensation increases as the current supplied by secondary winding 18b to field winding 11a approaches a ninety degree leading relation with respect to the signal current AC. Therefore, the circuit of Fig. 3 provides improved means for supplying an anticipating current component to field winding 11a which leads the signal input current to winding 11a by substantially ninety degrees, thereby providing the maximum effectiveness for anticipating compensation.

Although but two embodiments have been illustrated and described, it will be apparent to those skilled in the art that various changes and modifications may be made therein without departing from the spirit of the invention or from the scope of the appended claims.

It is claimed and desired to secure by Letters Patent:

1. In an electric regulating system, the combination of a first electric generator having field winding means and a first armature, a second electric generator having a second field winding and a second armature, first resistance means connected in series with said first armature and said second field winding, condition responsive means connected to said field winding means for impressing on said field winding means an electric signal which is a measure of the condition being regulated by said system, inductive control means for controlling said condition being regulated, second resistance means connected in series with said second armature and said control means, a first derivative transformer having a first primary winding and a first secondary winding, a second derivative transformer having a second primary winding and a second secondary winding, means connecting said first primary winding across said second field winding, the primary circuit of said first transformer having a negligible time constant to produce across said first secondary winding a first voltage proportional to the rate of change of the voltage of said second field winding, second means connecting said second primary winding across said control means, the primary circuit of said second transformer having a negligible time constant to produce across said second secondary winding a second voltage proportional to the rate of change of the voltage of said control means, and means connecting said secondary windings in circuit with said field winding means to supply to said field winding means currents proportional to the magnitudes of said first and second voltages, whereby the current in said control means is substantially in phase with said electric signal.

2. In an electric regulating system, the combination of an electric generator having an armature and field winding means, condition responsive means connected to said field winding means for impressing thereon an electric signal which is a measure of the condition being regulated by said system, inductive control means supplied with current by said armature for controlling said regulated condition, resistance means connected in series with said armature and said inductive control means, a derivative transformer having a primary winding and a secondary winding, means connecting said primary winding across said inductive control means, the primary circuit of said transformer having a negligible time constant for producing across said secondary winding an anticipating voltage proportional to the rate of change of the voltage across said control means, and means connecting said secondary winding across said field winding means to supply to said field winding means a current proportional to the magnitude of said anticipating voltage, whereby said current in said control means is substantially in phase with said electric signal.

3. In an electric regulating system, the combination of an electric generator having an armature and field winding means, condition responsive means connected to said field winding means for impressing thereon an electric signal which is a measure of the condition being regulated by said system, first resistance means connected in series with said condition responsive means and said field winding means to form a first circuit having a negligible time constant, inductive control means supplied with current by said armature for controlling said regulated condition, second resistance means connected in series with said armature and said inductive control means, a derivative transformer having a primary winding and a secondary winding, means connecting said primary winding across said inductive control means, the primary circuit of said transformer having a negligible time constant for producing across said secondary winding an anticipating voltage proportional to the rate of change of the voltage across said control means, and means connecting said secondary winding across said field winding means to supply to said field winding means a current proportional to the magnitude of said anticipating voltage, whereby said current in said control means is substantially in phase with said electric signal.

4. In a regulating system, the combination of a first electric generator having a first armature and field winding means, condition responsive means connected to said field winding means to impress thereon an electric signal which is a measure of the condition being regulated by said system, a second electric generator having a second armature and a field winding, first resistance means connected in series with said first armature and said field winding, inductive control means for controlling said condition, second resistance means connecting said second armature in series with said control means to supply current thereto, a first voltage divider having an adjustable tap and connected across said first armature, a first derivative transformer having a first primary winding and a first secondary winding, means connecting one terminal of said first primary winding to said adjustable tap and the other terminal of said first primary winding between said control means and said second resistance means, the primary circuit of said first transformer having a negligible time constant to produce across said secondary winding a first anticipating voltage proportional to the rate of change of the inductive voltage of said control means, a second voltage divider having a second adjustable tap and connected across said first armature, a second derivative transformer having a second primary winding and a second secondary winding, second means connecting one terminal of said second primary winding to said second adjustable tap and the other terminal of said second primary winding between said field winding and said first resistance means, the primary circuit of said second transformer having a negligible time constant to produce across said second secondary winding a second anticipating voltage proportional to the rate of change of the inductive voltage across said field winding, and means connecting said first and said second secondary windings in parallel with each other across said field winding means to supply currents to said field winding means proportional to the magnitudes of said first and said second anticipating voltages, whereby said current in said control means is substantially in phase with said electric signal.

DANIEL J. SIKORRA.

No references cited.